(12) United States Patent
Chen et al.

(10) Patent No.: US 7,479,024 B2
(45) Date of Patent: Jan. 20, 2009

(54) CONNECTING AND RELEASING APPARATUS FOR A CONNECTOR

(75) Inventors: You-Yu Chen, Linkou Hsiang (TW); Yung-Shun Chen, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 12/003,423

(22) Filed: Dec. 26, 2007

(65) Prior Publication Data

US 2008/0311784 A1 Dec. 18, 2008

(30) Foreign Application Priority Data

Jun. 14, 2007 (TW) .............................. 96209794 U

(51) Int. Cl.
*H01R 13/62* (2006.01)
(52) U.S. Cl. ..................................................... 439/310
(58) Field of Classification Search ................. 439/310; 361/686, 683
See application file for complete search history.

(56) References Cited

U.S. PATENT DOCUMENTS

| | | | | |
|---|---|---|---|---|
| 5,535,093 A * | 7/1996 | Noguchi et al. | ............ | 361/686 |
| 5,751,546 A * | 5/1998 | Clark et al. | ................ | 361/686 |
| 6,264,488 B1 * | 7/2001 | Helot et al. | ................ | 439/341 |
| 6,533,599 B1 * | 3/2003 | Singleton, Jr. | ............. | 439/347 |
| 6,912,125 B2 * | 6/2005 | Weng | ......................... | 361/686 |

* cited by examiner

*Primary Examiner*—Phuong K Dinh
(74) *Attorney, Agent, or Firm*—Rabin & Berdo, PC

(57) ABSTRACT

A connector connecting and releasing apparatus for a connector set within a casing of a module connected with an apparatus is provided. The resisting portion comprises a sliding part protruding out of the casing of the module, and a first elastic part set between the sliding part and the casing. The sliding part moves inward the casing as forcing direction. The first elastic part provides a resilient force to move the sliding part protrude out of the casing. The arm structure comprises a pivot set on a predetermined location of the casing, a forcing arm set on one side of the pivot and contacting the sliding part, and a resisting arm set on the other side of the pivot. When the forcing arm is pressed by the sliding part, the arm structure rotates around the pivot, and the resisting arm forces the connector upward to protrude out of the casing.

5 Claims, 2 Drawing Sheets

CONNECTING AND RELEASING APPARATUS FOR A CONNECTOR

RELATED APPLICATIONS

This application claims priority to Taiwan Application Serial Number 96209794, filed Jun. 14, 2007, which is herein incorporated by reference.

BACKGROUND

1. Field of Invention

The present invention relates to a connecting and releasing apparatus for a connector. More particularly, the present invention relates to a connector connecting and releasing apparatus for a connector used for a function expanding platform module of a notebook computer, wherein the connector can be embedded in the function expanding platform module.

2. Description of Related Art

Mobility and portability are two of the most important features for notebook computers. For example, a user may need to easily carry the notebook computer out of the office for processing some simple or routine operations, and easily carry the notebook computer back to the office for processing some complex or heavy-loading operations. For increasing the mobility and portability of notebook computers, a design of function expanding platform module is accordingly introduced to notebook computers. By way of the function expanding platform module, a user can only carry the main body of notebook computer out of the office for some simple or routine operations, and come back to the office for processing some complex or heavy-loading operations by connecting the main body of notebook computer to the function expanding platform module. The portability and performance for notebook computers are accordingly improved.

For the above-mentioned easy-carrying purpose, a female connector with a recess structure is usually used for the notebook computer. A male connector with a protrusion structure is used for the function expanding platform module, wherein the male connector protrudes out of the casing of the function expanding platform module. By the design of function expanding platform module for the notebook computer, if the female connector and the male connector are misalignment, and user is not aware of the misalignment and then forces to connect the female connector and the male connector, the female connector and the male connector may be damaged, and more seriously, the function expanding platform module and the notebook computer may also be damaged by stress attack.

Thus, it is very important to provide an improved connector connecting and releasing apparatus for overcoming the above-mentioned problem.

SUMMARY

It is therefore an aspect of the present invention to provide a connector connecting and releasing apparatus. When not in use, the connector set on the function expanding platform module can be embedded within the casing of the function expanding platform module. When in use, the connector set on the function expanding platform module can protrude out of the casing of the function expanding platform module, so that the function expanding platform module and the notebook computer can be prevented from damage by stress attack.

In accordance with the foregoing and other aspects of the present invention, a connector connecting and releasing apparatus for a connector set within a casing of a module connected with an apparatus is provided. The connector connecting and releasing apparatus comprises: a resisting portion, an arm structure and a connector. The resisting portion comprises a sliding part protruding out of the casing of the module and moving inward the casing as an applying direction of an external force, and a first elastic part set between the sliding part and the casing and providing a resilient force to move the sliding part to protrude out of the casing. The arm structure comprises a pivot set on a predetermined location of the casing, a forcing arm set on one side of the pivot and contacting the sliding part, and a resisting arm set on the other side of the pivot. The connector connects with the resisting arm. When the forcing arm is pressed by the sliding part, the arm structure rotates around the pivot as an axis, and the resisting arm forces the connector upward to protrude out of the casing.

The connector connecting and releasing apparatus further comprises a second elastic part set between the connector and the casing, for providing a resilient force on the connector to move in a direction inward the casing.

Furthermore, the combination of the resilient forces of the first elastic part and the second elastic part is preferred larger than the combination of the weight of the apparatus and the friction force of the connector during releasing the connector.

In accordance with the embodiments of the present invention, the resisting portion further comprises a locating pin set on the casing. The locating pin is sheathed by the sliding part or the first elastic part, for restraining the movement of the sliding part or the first elastic part.

The sliding part further comprises an alignment part is set on the top surface of the sliding part.

These and other features, aspects, and advantages of the present invention will become better understood with reference to the following description, figures, and appended claims.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

The spirit of the present invention will be disclosed by the following drawings and detailed description. After understanding the preferred embodiment of the present invention, one who skilled in the art may make some modifications and variations for the present invention, which still fall within the scope and spirit of the invention.

Figure 1:
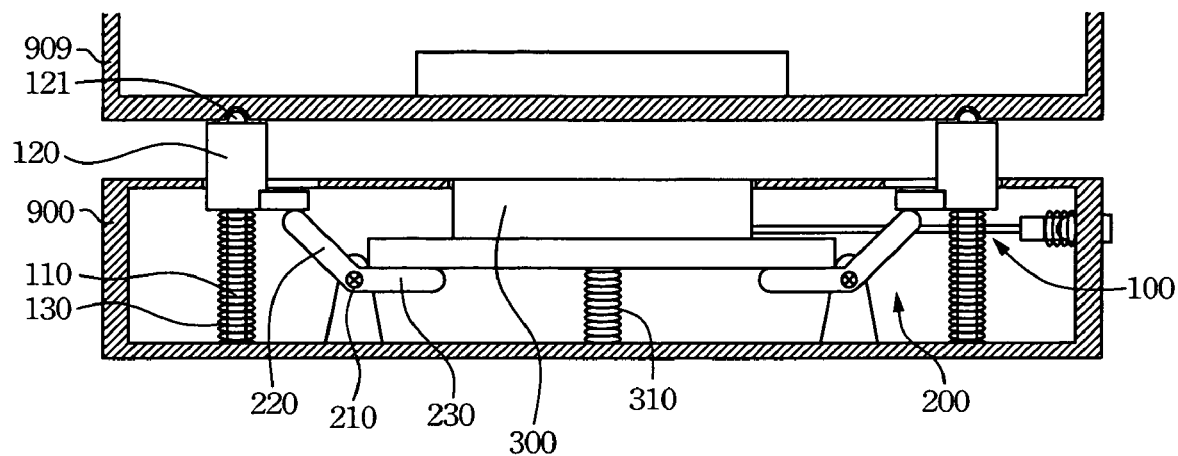
FIG. 1 is a front cross-sectional view of a connector connecting and releasing apparatus, which is embedded within a casing, according to a preferred embodiment of the present invention.
Figure 2:
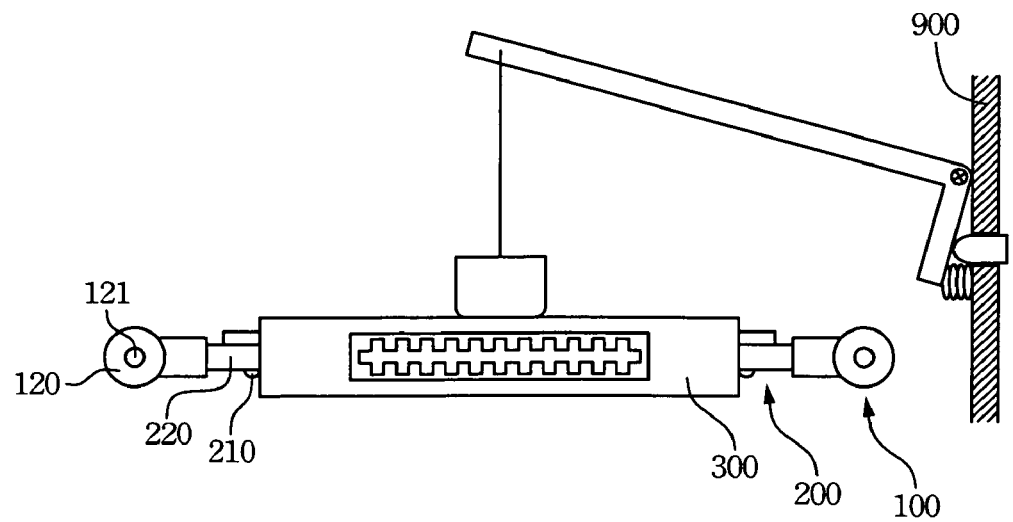
FIG. 2 is a perspective view of the connector connecting and releasing apparatus shown in FIG. 1.
Figure 3:
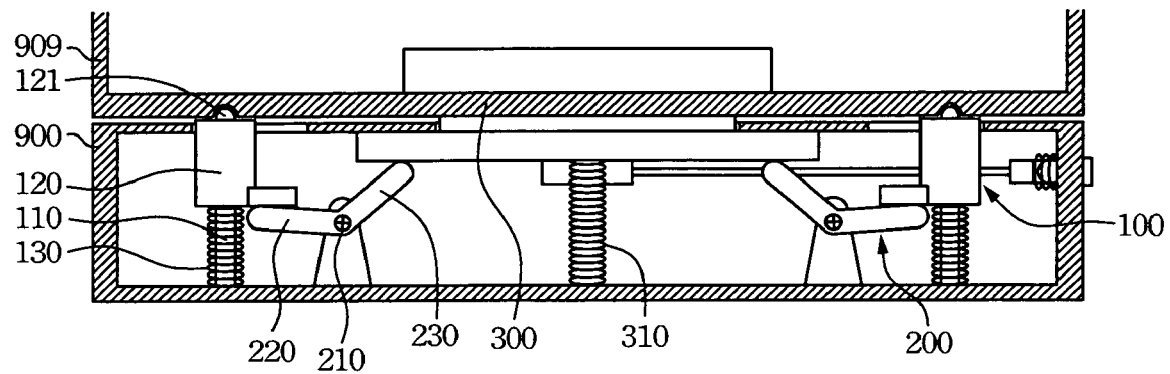
FIG. 3 is a front cross-sectional view of a connector connecting and releasing apparatus, which protrudes out of a casing, according to another preferred embodiment of the present invention.
Figure 4:
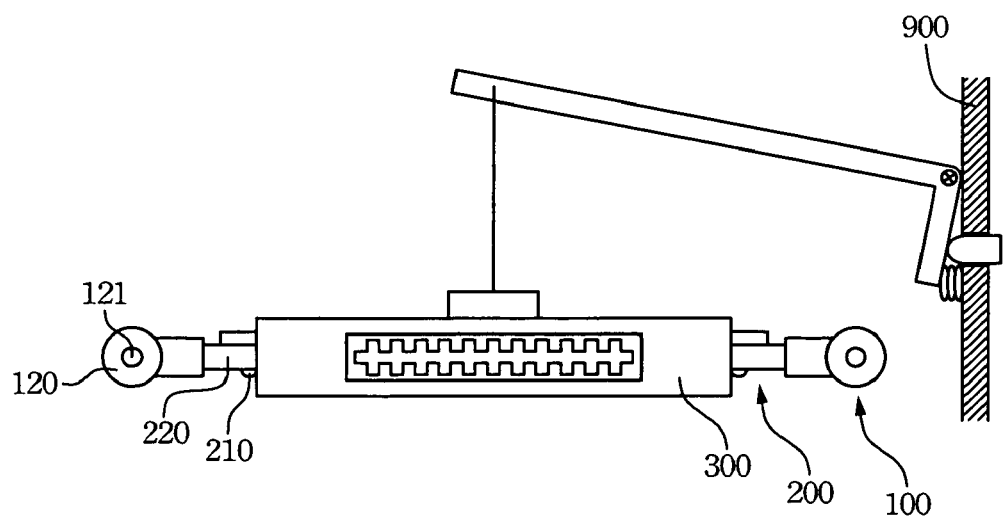
FIG. 4 is a perspective view of the connector connecting and releasing apparatus shown in FIG. 3.

FIG. 1 is a front cross-sectional view of a connector connecting and releasing apparatus, which is embedded within a casing, according to a preferred embodiment of the present invention. FIG. 2 is a perspective view of the connector connecting and releasing apparatus shown in FIG. 1. FIG. 3 is a front cross-sectional view of a connector connecting and releasing apparatus, which protrudes out of a casing and connects into an apparatus, according to another preferred embodiment of the present invention. FIG. 4 is a perspective view of the connector connecting and releasing apparatus shown in FIG. 3. As shown in FIGS. 1-4, a connector connecting and releasing apparatus is set on a casing of function expanding platform module 900 for an apparatus (for example, notebook computer) 909. The present connector connecting and releasing apparatus includes resisting portions 100, arm structures 200 and a connector 300. As shown in FIGS. 1 and 3, the number of the resisting portions 100 is preferred two, and the number of the arm structures 200 is also preferred two.

The resisting portion 100 includes a sliding part 120 and a first elastic part 130. The sliding part 120 protrudes out of the casing of a function expanding platform module 900, or is embedded within the casing of the function expanding platform module 900 according to the imposing force along a predetermined path, depending upon the different operation status of the sliding part 120. The first elastic part 130 is set between the sliding part 120 and the casing of the function expanding platform module 900, for providing a resilient force to move the sliding part 120 to protrude out of the casing of function expanding platform module 900. According to the preferred embodiment of the present invention, the resisting portion 100 further includes a locating pin 110. The sliding part 120 sheathes the locating pin 110 and slides along the locating pin 110. The first elastic part 130 also sheathes the locating pin 110 and connects between the sliding part 120 and the casing of the function expanding platform module 900. The locating pin 110 is used for limiting the sliding range of the sliding part 120 and the extension range of the first elastic part 130. When the sliding part 120 presses on the first elastic part 130 in a direction, the first elastic part 130 deforms and provides a resilient force for resisting the sliding part 120 in a reverse direction.

The sliding part 120 further includes an alignment part 121, which is set on the top surface of the sliding part 120. When the apparatus 909 is connected with the connector 300, the alignment part 121 is used for aligning the apparatus 909 and the connector 300 in order to engage each other. The alignment part 121 can be made of soft and elastic materials for providing a buffer for preventing stress attack during alignment.

The arm structure 200 is set between the resisting portion 100 and the connector 300. The arm structure 200 includes a pivot 210, a forcing arm 220 and a resisting arm 230. The pivot 210 is set on a predetermined location of the casing of function expanding platform module 900. The arm structure 200 rotates by using the pivot 210 as an axis. The forcing arm 220 and the resisting arm 230 are set on the opposite sides of the pivot 210 respectively. The forcing arm 220 contacts the sliding part 120 and the resisting arm 230 contacts the connector 300. When the forcing arm 220 is pressed by the sliding part 120, the arm structure 200 rotates, and the resisting arm 230 simultaneously forces the connector 300 to protrude out of the casing 900.

Following are the descriptions of the operation process for the present connector connecting and releasing apparatus.

Referring to FIG. 1, an initial status of the operation process for the present connector connecting and releasing apparatus is shown. At the initial status, the sliding part 120 protrudes out of the casing 900, and the connector 300 is embedded within the casing 900. And, a predetermined location on the apparatus (for example, notebook computer) 909 aligns the alignment part 121 and the apparatus 909 presses the sliding part 120. Then the sliding part 120 resists the resilient force from the first elastic part 130, and presses the forcing arm 220 to rotate the arm 200 around the pivot 210. Next, the resisting arm 230 pushes the connector 300 up, and the connector 300 protrudes out of the casing 900 and electrically connects the apparatus 909, as shown in FIG. 3, which illustrates a connecting status of the operation process for the present invention.

At the connecting status shown in FIG. 3, because of the weight of the connector 300 itself, the connector 300 is moved downward and embedded within the casing 900 gradually. At the same time, the apparatus 909 is moved away from the top surface of the casing 900. The connector 300 is moved downward and embedded within the casing 900 continuously because of the weight itself. The resisting arm 230 is then pressed to make the arm 200 rotate around the pivot 210 as an axis. The sliding part 120 protrudes out of the casing 900 by way of the resilient force from the first elastic part 130 and the pushing force from the forcing arm 220. Then the initial status of the operation process for the present invention returns, as shown in FIG. 1.

For making sure whether the connector 300 is embedded within the casing 900 totally, a second elastic part 310 is set between the connector 300 and the casing 900, as shown in FIGS. 1 and 3. The second elastic part 310 is used for providing a resilient force on the connector 300 to move in an inward direction towards the casing 900.

At the initial status with the second elastic part 310, when the connector 300 is connected to the apparatus 909, not only the resilient force of the first elastic part 130 should be restrained, but also the resilient force of the second elastic part 310 should be restrained. On the contrary, when the connector 300 is released from the apparatus 909, the second elastic part 310 can provide additional force to make sure the connector 300 embedded within the casing 900.

Furthermore, when the connector 300 is released from the apparatus 909, if the combination of the resilient forces of the first elastic part 130 and the second elastic part 310 is larger than the combination of the weight of the apparatus 909 and the friction force of the connector 300 then the sliding part 120 can be pushed up naturally by way of the combination of the resilient forces of the first elastic part 130 and the second elastic part 310, so that the connector 300 can be released from the apparatus 909 and embedded within the casing 900.

There are still a variety of embodiments within the scope of the present invention. For example, the shapes and structures of devices are not limited in the above-mentioned embodiments and figures of the present invention. Any kind of shapes and structures of devices that fulfill the purpose of pushing the connector 300 upward by way of the sliding part 120 engaging the arm 200 can be used. In addition, the first elastic part 130 and the second elastic part 310 are not limited in simple spring structures, as shown in FIGS. 1-4, other elastic structures, such as torque springs, can also be used, if only the torque springs or other elastic structures can be operated together with a cam structure, to perform the present functions smoothly. According to the embodiments of the present invention, the sliding part 120 and the connector 300 move upward and downward in a vertical direction. However, the sliding part 120 and the connector 300 can also move forward and backward in a horizontal direction. In this horizontal case, the connector 300 can also be pushed out of the casing 900. If the second elastic part 310 is not set in the casing 900, another device should be introduced to provide force to press the connector 300 embedded within the casing 900 for restoring the connector 300 embedded within the casing 900 when the connector 300 is released from the apparatus 909. All of the above-mentioned modifications and variations are fall within the scope of the following claims and their equivalents.

According to the embodiments of the present invention, the present connector connecting and releasing apparatus can be used for a connector embedded in a function expanding platform module efficiently. Therefore, when a notebook connects with its function expanding platform module, the damage resulted in stress attack can be eliminated.

Although there are some embodiments have been disclosed above, they are not used to limit the scope of the present invention. It will be apparent to those skilled in the art that various modifications and variations can be made to the structure and method of the present invention without departing from the scope or spirit of the invention. In view of the foregoing, it is intended that the present invention cover modifications and variations of this invention provided they fall within the scope of the following claims and their equivalents.

What is claimed is:

1. A connector connecting and releasing apparatus for a connector set within a casing of a module connected with an apparatus, comprising:
    a resisting portion, comprising:
        a sliding part protruding out of the casing of the module, wherein the sliding part moves inward the casing along a forcing direction; and
        a first elastic part disposed between the sliding part and the casing, for providing a resilient force to move the sliding part to protrude out of the casing;
    an arm structure, comprising;
        a pivot disposed on a predetermined location of the casing;
    a forcing arm disposed on one side of the pivot and in contact with the sliding part; and
        a resisting arm disposed on the other side of the pivot; and a the connector, connecting with the resisting arm,
    wherein when the forcing arm is pressed by the sliding part, the arm structure rotates using the pivot as an axis, and the resisting arm forces the connector upward to protrude out of the casing.

2. The connector connecting and releasing apparatus of claim 1, further comprising a second elastic part disposed between the connector and the casing, for providing a resilient force on the connector to move in a direction inward the casing.

3. The connector connecting and releasing apparatus of claim 2, wherein a combination of the resilient forces of the first elastic part and the second elastic part is larger than a combination of the weight of the apparatus and a friction force of the connector during releasing of the connector.

4. The connector connecting and releasing apparatus of claim 1, wherein the resisting portion further comprises a locating pin disposed within the casing, and the sliding part or the first elastic part sheathes the locating pin and slides along the locating pin.

5. The connector connecting and releasing apparatus of claim 1, wherein the sliding part further comprises an alignment part disposed on the top surface of the sliding part.

* * * * *